United States Patent
Iniguez Franco et al.

(10) Patent No.: US 12,552,083 B2
(45) Date of Patent: Feb. 17, 2026

(54) IONIZED NOZZLE

(71) Applicant: NIAGARA BOTTLING, LLC, Diamond Bar, CA (US)

(72) Inventors: Fabiola Maria Iniguez Franco, Glendora, CA (US); Leroy Magwood, Rancho Cucamonga, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 18/923,414

(22) Filed: Oct. 22, 2024

(65) Prior Publication Data
US 2025/0135707 A1    May 1, 2025

Related U.S. Application Data

(60) Provisional application No. 63/593,481, filed on Oct. 26, 2023.

(51) Int. Cl.
*B29C 49/42*    (2006.01)
*B29C 49/12*    (2006.01)

(52) U.S. Cl.
CPC .... *B29C 49/42416* (2022.05); *B29C 49/1212* (2022.05)

(58) Field of Classification Search
CPC ... B29C 49/42; B29C 49/12; B29C 49/42416; B29C 49/1212
See application file for complete search history.

(56) References Cited

U.S. PATENT DOCUMENTS

| | | |
|---|---|---|
| 2,686,141 A | 8/1954 | Sawyer |
| 4,795,597 A | 1/1989 | Whiteley et al. |
| 2014/0015171 A1* | 1/2014 | Herold ............... B29C 49/4252 264/483 |
| 2017/0100872 A1 | 4/2017 | Clarke |
| 2020/0298461 A1 | 9/2020 | Hanan et al. |

FOREIGN PATENT DOCUMENTS

GB    1289698    * 12/1969

OTHER PUBLICATIONS

International Search Report and Written Opinion for Application No. PCT/US2024/052392 dated Dec. 10, 2024 (9 pages).

* cited by examiner

*Primary Examiner* — Alison L Hindenlang
*Assistant Examiner* — Shibin Liang
(74) *Attorney, Agent, or Firm* — Michael Best & Friedrich LLP

(57) ABSTRACT

A blow molding station may include a mold configured to support the preform. A blow molding station may include a stretch rod configured to stretch the preform within the mold. A blow molding station may include a nozzle configured to direct pressurized gas into the preform. A blow molding station may include a high-voltage module configured to impart an electrostatic charge to the pressurized gas directed into the preform.

9 Claims, 6 Drawing Sheets

IONIZED NOZZLE

CROSS-REFERENCE TO RELATED APPLICATIONS

This application claims priority to U.S. Provisional Patent Application No. 63/593,481, filed Oct. 26, 2023, the entire content of which is incorporated herein by reference.

FIELD

The present disclosure relates to equipment for producing containers, and more particularly to spray nozzles used in blow molding plastic bottles.

BACKGROUND

Polymer bottles are typically produced by injection molding a preform followed by blow molding the preform into a bottle. Blow molding typically includes heating the preform, stretching the preform by inserting a stretch rod, and blowing pressurized air to expand the preform. Contaminants, such as airborne contaminants including macroparticles and microparticles, may undesirably enter the preform during any of the processing stages between formation of the preform and the blow molding step.

SUMMARY

The present disclosure provides, in one aspect, a blow molding station for blow molding a preform into a bottle, the blow molding station including: a mold configured to support the preform; a stretch rod configured to stretch the preform within the mold; a nozzle configured to direct pressurized gas into the preform; and a high-voltage module configured to impart an electrostatic charge to the pressurized gas directed into the preform.

The present disclosure provides, in another aspect, a stretch rod for a blow molding station, the blow molding station configured to blow mold a preform into a bottle, the stretch rod including: an elongated rod section; and a nozzle configured to direct pressurized gas into the preform, the nozzle further configured to impart an electrostatic charge to the pressurized gas directed into the preform.

The present disclosure provides, in another aspect, a method of blow molding a preform into a bottle, the method including: inserting the preform into a blow mold; stretching the preform via a stretch rod; ionizing the pressurized gas via a high-voltage module; and directing the pressurized gas into the preform.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
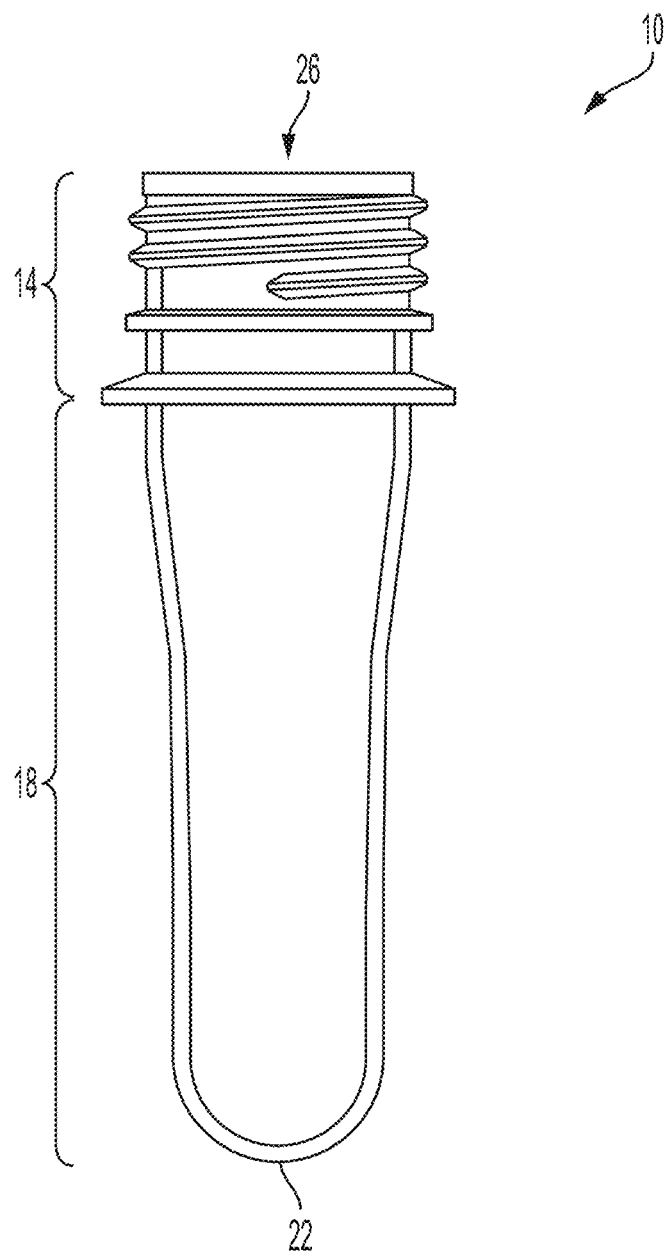
FIG. 1 is a side view of a preform suitable to be blow-molded to form a bottle.

FIG. 1 illustrates a preform 10 configured to be blow-molded to form a bottle or container. The preform 10 includes a neck 14 and a body 18, with the body defining an end 22. The end 22 is positioned on a side of the body 18 opposite the neck 14. The neck 14 defines an opening 26. The preform 10 may be formed from a resin material that is suitable for contact with food and beverages such as, e.g., polyethylene terephthalate (PET). The preform 10 is formed by injection molding, during which the resin is injected through a gate into an injection mold and then cooled to harden and maintain its shape.

Figure 2:
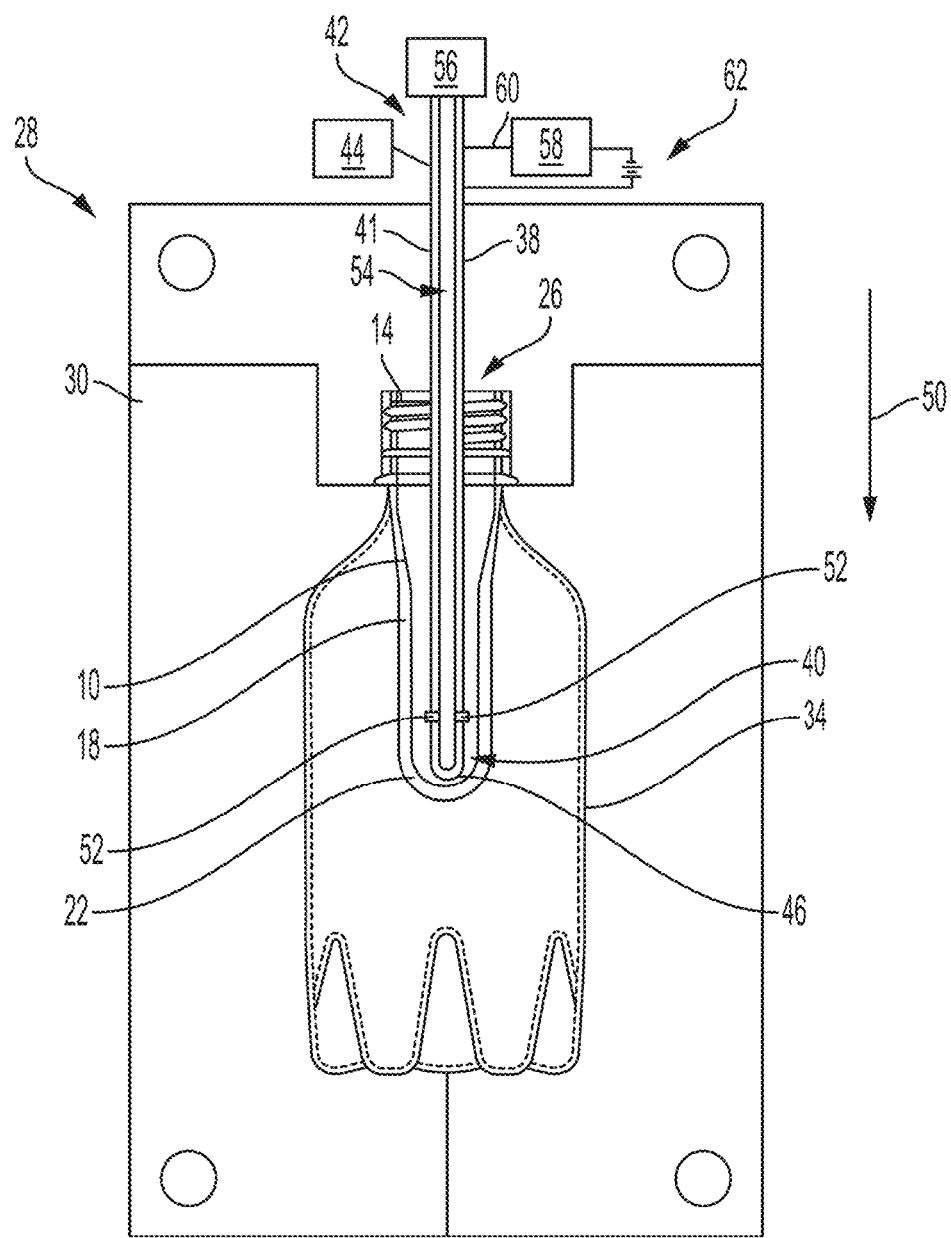
FIG. 2 is a cross-section view of the preform of FIG. 1 positioned within a blow molding station.

FIG. 2 illustrates a blow molding station 28 for blow molding the preform 10 into a bottle (not shown). The blow molding station 28 includes a mold 30 that supports the preform 10 during the blow molding process and defines the shape of the resultant bottle. The mold 30 includes an internal cavity 34 in the shape of the bottle. The blow molding station 28 also includes a stretch rod 38 having an elongated rod section 41 with a distal or first end 40 and a proximal or second end 42 opposite the first end 40. The first end 40 includes a tip portion or head 46. The second end 42 is coupled to an actuator 44 operable to move the stretch rod 38 in an insertion direction 50 and a retraction direction opposite the insertion direction 50.

Prior to blow-molding, the preform 10 is heated (e.g., by infrared radiation, by microwaves, etc.) to a preform temperature. In some embodiments, the preform 10 is heated evenly. In other embodiments, the body 18 is heated more than the neck 14. The heated preform 10 is secured in the mold 30 by the neck 14. During blow molding, the actuator 44 pushes the stretch rod 38 into the mold 30 and the opening 26. The head 46 contacts the end 22 of the preform 10. The stretch rod 38 stretches the preform 10 along the insertion direction 50. Simultaneously or thereafter, pressurized air is blown into the preform 10. The pressurized air stretches the body 18, causing the body 18 to press against the internal cavity 34 and assume its shape. In other words, the pressurized air blows the preform 10 into the bottle. In some embodiments, other gases or gas mixtures such as, e.g., nitrogen, carbon dioxide, and the like, can be pressurized and utilized in place of air. Following the blow molding process, the stretch rod 38 retracts from the bottle in the retraction direction opposite the insertion direction 50. The bottle is then removed from the mold 30.

Figure 3:
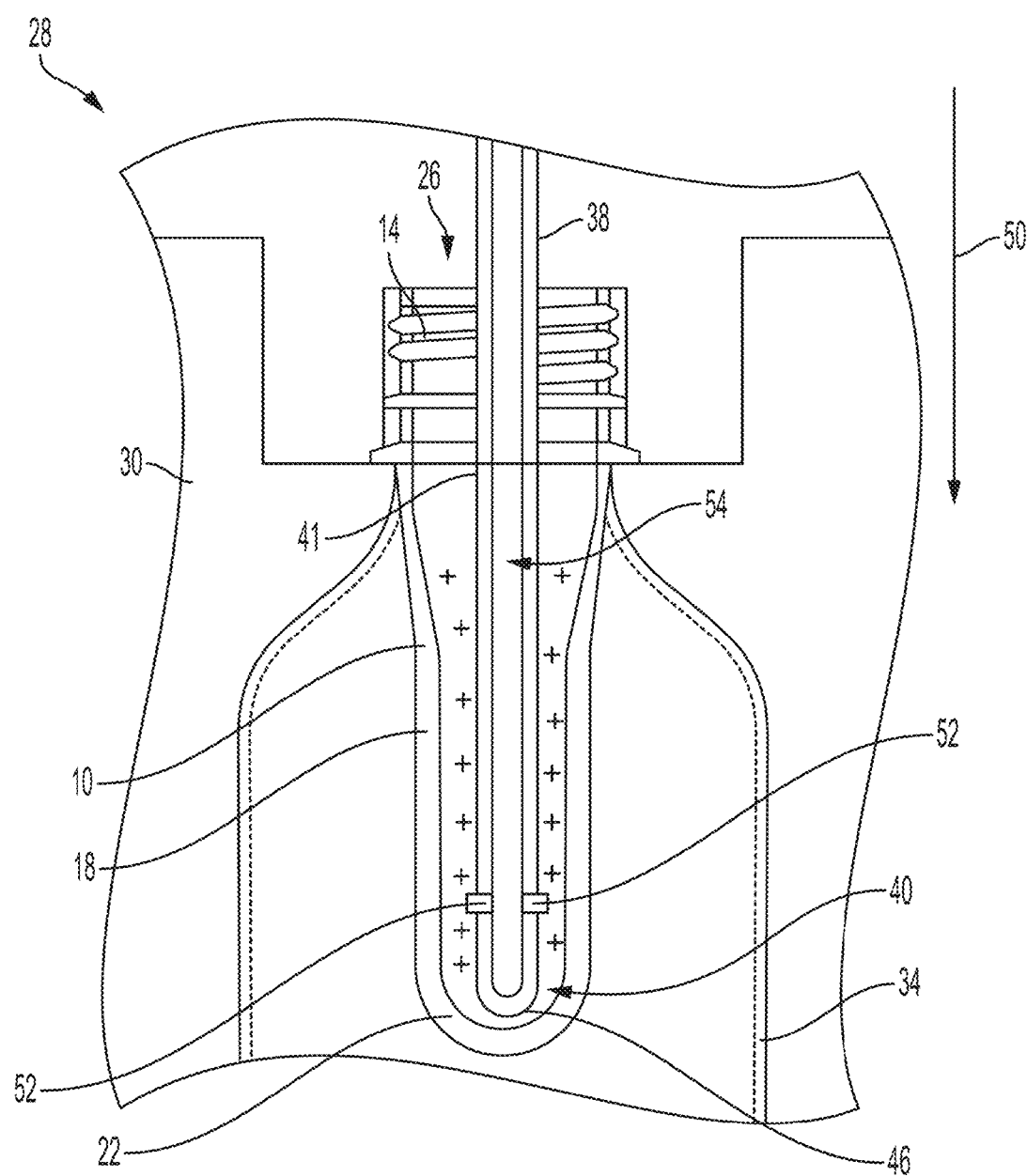
FIG. 3 is another cross-section view of portions of the blow molding station of FIG. 2 and the preform of FIG. 1.

With reference to FIGS. 2 and 3, the stretch rod 38 also includes one or more nozzles 52 positioned on the rod section 41. In some embodiments, the nozzles 52 can be formed simply as apertures defined in the sidewalls of the rod section 41, while in other embodiments, the nozzles 52 can be separately formed members that are coupled to the rod section 41. The rod section 41 also defines a hollow interior passageway 54 that fluidly communicates with the nozzles 52. The rod section 41 is further coupled to a high pressure air source 56, such as an air compressor. As such, the pressurized air that is blown into the preform 10 during the blow molding process passes through the interior passageway 54 of the rod section 41 and enters the preform 10 via the nozzles 52 of the stretch rod 38.

The molding station 28 also includes a high-voltage module 58 electrically coupled to the rod section 41 of the stretch rod 38 via a high voltage conductor 60. The high-voltage module 58 receives power from a power source 62 (e.g., a DC voltage source or an AC voltage source) and generates an amplified or high voltage. During operation, the stretch rod 38, including the rod section 41 and the nozzles 52, is electrostatically charged or ionized (either positively or negatively) via the high-voltage module 58. As the pressurized air (or other gas or gas mixture) is blown through the interior passageway 54 and out the nozzles 52 the electrostatic charge is imparted from the rod section 41 and/or from the nozzles 52 to the air molecules exiting the nozzles. This results in electrostatically charged or ionized air molecules blowing into the preform 10 during blow molding, as illustrated by the plus symbols in FIG. 3.

Contaminants, such as airborne contaminants including macroparticles and microparticles, may undesirably enter the preform 10 during any of the processing stages between formation of the preform and the blow molding step. During blow molding, the compressed air blown into the preform 10 can remove at least some of these contaminants. When the compressed air is ionized as taught by the present disclosure, the statically charged air molecules exert greater attractive forces toward the contaminants. Thus, relatively more contaminants can be removed from the interior of the preform 10 during the blow molding process by utilizing ionized compressed air as compared to uncharged air.

Figure 4:
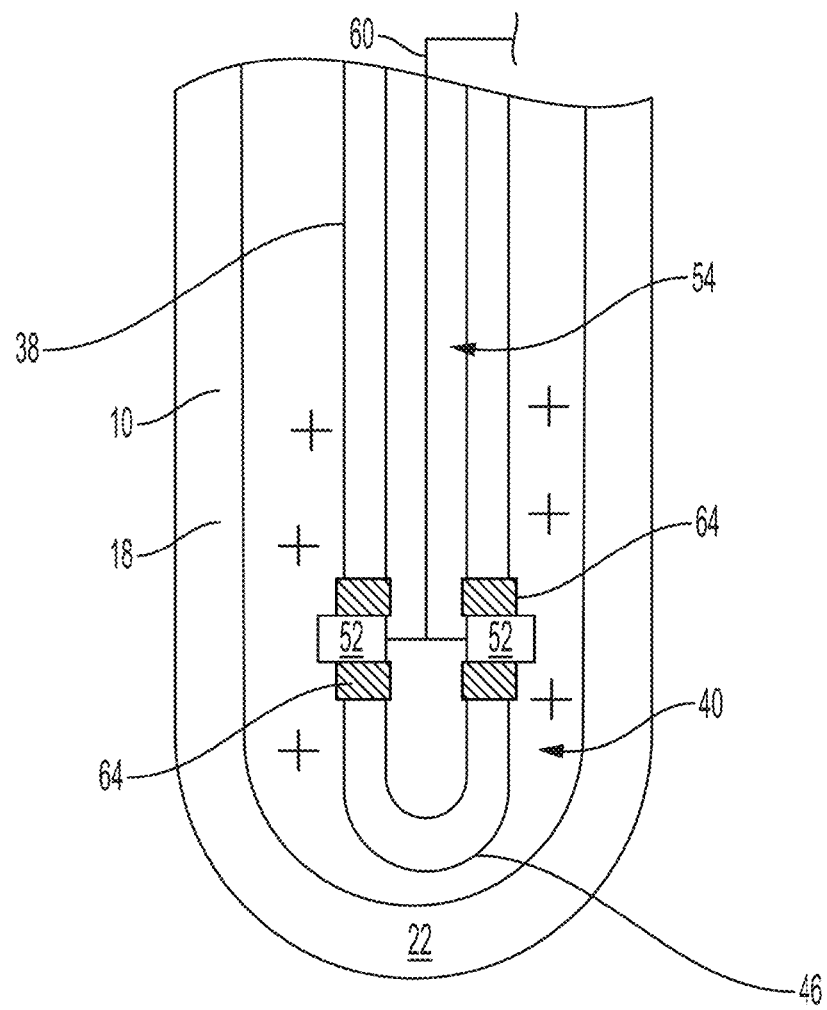
FIG. 4 is a cross-section view of portions of the preform of FIG. 1 and portions of a blow molding station according to another embodiment of the disclosure.

FIG. 4 illustrates portions of an alternative embodiment of the molding station 28. The embodiment of the molding station 28 shown in FIG. 4 is nearly identical to the embodiment shown in FIGS. 2 and 3 except for the following differences. In the embodiment of FIG. 4, the stretch rod 38 further includes an insulator 64 that electrically isolates the nozzle 52 from the rod section 41. The high voltage conductor 60 is electrically connected directly to the nozzle 52 and is not electrically connected to the rod section 41. In this embodiment, the pressurized air is ionized only at the nozzles 52 themselves. The insulator 64, which can be formed as, e.g., a ring, and made from, e.g., an insulating material such as rubber or another elastomer, or a resin material, or the like, prevents the rod section 41 from acquiring a static charge. Preventing the rod section 41 itself from acquiring a charge can be advantageous because it can inhibit oxidation of the rod section 41, which can be formed from a metal such as stainless steel that is prone to oxidation.

Figure 5:
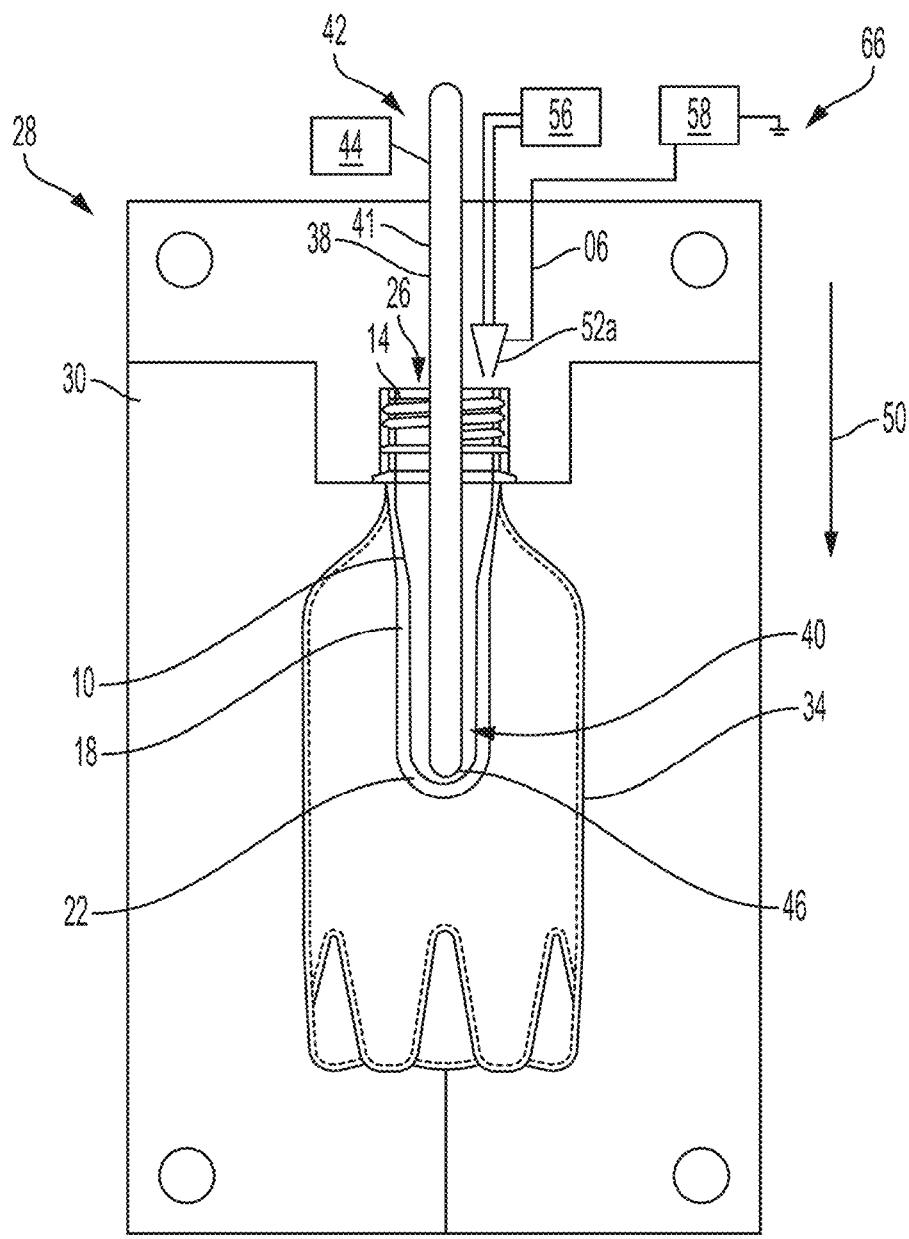
FIG. 5 is a cross-section view of the preform of FIG. 1 and a blow molding station according to another embodiment of the disclosure.

FIG. 5 illustrates portions of an alternative embodiment of the molding station 28. The embodiment of the molding station 28 shown in FIG. 5 is similar to the embodiment shown in FIGS. 2 and 3 except for the following differences. In the embodiment of FIG. 5, the stretch rod 38 does not include the nozzles. Instead, the molding station 28 includes one or more separate nozzles 52a (only one nozzle 52a is illustrated, although more may be included). The nozzle 52a is located near the opening 26 of the preform 10 and arranged to direct the compressed air into the preform 10 via the opening 26 during blow molding. The high voltage conductor 60 is electrically connected directly to the nozzle 52a and is not electrically connected to the rod section 41. In this embodiment, the pressurized air is ionized only at the nozzles 52 themselves. The high-voltage module 58 is further coupled to a source of grounding 66.

Figure 6:
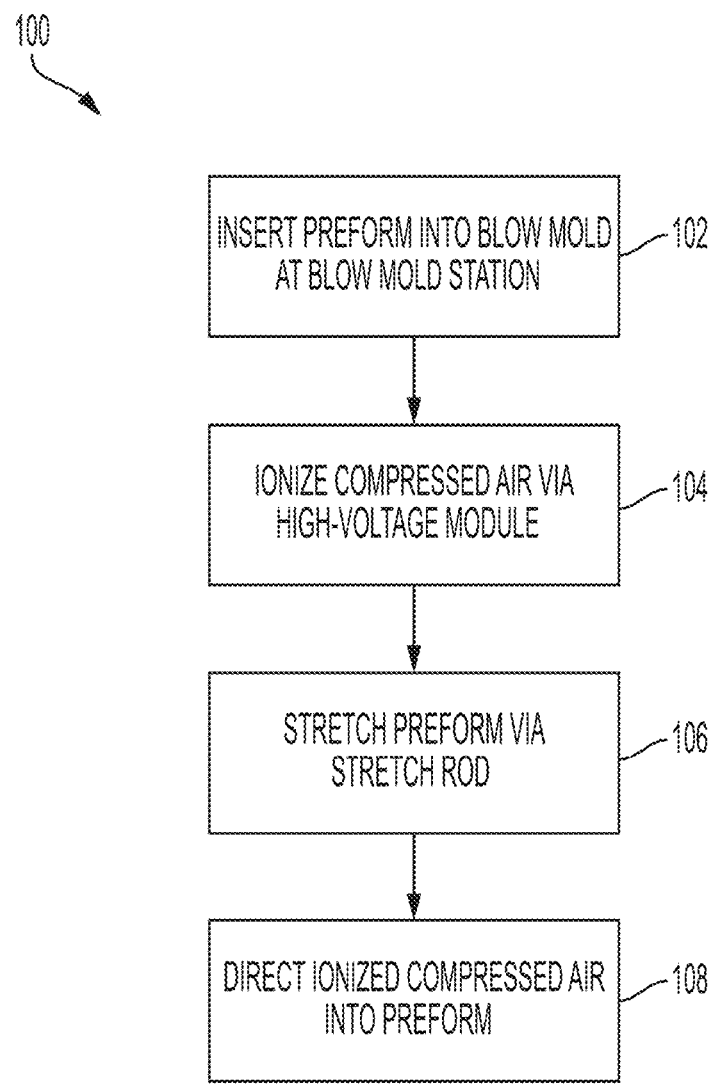
FIG. 6 illustrates a method of blow molding a preform according to an embodiment of the disclosure.

FIG. 6 depicts a method 100 of blow molding a preform into a bottle. At step 102, the preform is supported in a blow mold at a blow molding station. At step 104, the preform is stretched via a stretch rod. At step 106, compressed air is ionized via a high-voltage module. At step 108, ionized compressed air is directed into the preform to stretch the preform.

Although the disclosure has been described in detail with reference to preferred implementations, variations and modifications exist within the scope and spirit of one or more independent aspects of the disclosure as described. More particularly, one of ordinary skill in the art will understand the scalability of the above-described ingredient preparation and batching system. The system is scalable to accommodate any number of desired production lines.

What is claimed is:
1. A blow molding station for blow molding a preform into a bottle, the blow molding station comprising:
   a mold configured to support the preform;
   a stretch rod configured to stretch the preform within the mold and having
   a nozzle configured to direct pressurized gas into the preform; and
   a high-voltage module configured to impart an electrostatic charge via the nozzle to the pressurized gas directed into the preform.
2. The blow molding station of claim 1, wherein the stretch rod includes a rod section defining an interior passageway that fluidly couples the nozzle to a source of the pressurized gas.
3. The blow molding station of claim 1, wherein an insulator electrically isolates the nozzle from the stretch rod.
4. The blow molding station of claim 1, wherein the nozzle is positioned adjacent an opening of the preform.
5. The blow molding station of claim 1, wherein a high voltage conductor extends along the stretch rod and electrically connects the nozzle to the high-voltage module.
6. The blow molding station of claim 1, wherein the nozzle is one of a plurality of nozzles, and wherein each nozzle of the plurality of nozzles is electrically connected to the high-voltage module and configured to impart the electrostatic charge to the pressurized gas.
7. The blow molding station of claim 1, further comprising an actuator configured to move the stretch rod toward and away from the preform.
8. A blow molding station for blow molding a preform into a bottle, the blow molding station comprising:
   a mold configured to support the preform;
   a stretch rod configured to stretch the preform within the mold and having a nozzle configured to direct pressurized gas into the preform; and
   a high-voltage module
   wherein the stretch rod and the nozzle are electrically connected to the high-voltage module.
9. A blow molding station for blow molding a preform into a bottle, the blow molding station comprising:
   a mold configured to support the preform;
   a stretch rod configured to stretch the preform within the mold and having a nozzle configured to direct pressurized gas into the preform; and
   a high-voltage module wherein the nozzle is electrically connected to the high-voltage module and the stretch rod is electrically isolated from the high-voltage module.

\* \* \* \* \*